United States Patent Office 2,963,494
Patented Dec. 6, 1960

2,963,494
PURIFICATION OF STEROLS

Fay L. Cunningham, Kenneth W. Riebe, and John Ward Greiner, Kalamazoo, Mich., assignors to The Upjohn Company, Kalamazoo, Mich., a corporation of Michigan No Drawing. Filed Dec. 16, 1957, Ser. No. 702,755

7 Claims. (Cl. 260—397.25)

This invention relates to a process for producing purified sterols from mixtures containing sterols and non-sterol impurities such as tars, coloring matter, sterol degradation products, sterol esters, and the like. It relates particularly to a process for purifying sitosterol and is directed in one of its important aspects to the preparation of purified sitosterol from crude sitosterol occurring as a filtrate residue or desolventized solid residue from the fractionation separation of soybean sterols.

Sterols occur in the unsaponifiable material in the refining of vegetable oils and waxes. Their state of purity is dependent upon the original character of oil or wax and also upon the character of the methods used in refining. The materials which can be purified by the process of this invention include those crude sterols which contain a major proportion of sterol, preferably a predominant single sterol such as sitosterol, and minor proportions, e.g., twenty percent by weight, or less, of substances that are technically regarded as impurities, such as tars or other coloring matter, sugars, protein, dirt, sterol degradation products, sterol esters, and the like.

This invention is also applicable to sterol fractions obtainable in the steps of separating unsaponifiable or crude sterol mixtures into fractions enriched in sterol material. One such material to which this invention is especially applicable is the crude sitosterol fraction obtained as a residue from the fractionation separation of soybean sterols, as previously mentioned. Other sterol materials which can be purified by this invention are tall oil sterols, cotton seed oil sterols, calabar bean oil sterols, sterol fractions, particularly sitosterol fractions, obtainable from the unsaponifiables in the refining of sugar cane wax, soybean oil, corn oil, wheat germ oil, and the like.

Crude sitosterol occurs as a residue in the fractionation separation of soybean sterols or other plant sterols by countercurrent leaching or other fractionation processes. A suitable sitosterol residue is the one that is produced as a filtrate or desolventized still residue in the solvent recovery from the mother liquors of a countercurrent fractionation of soybean sterols whereby solid stigmasterol is produced.

Sitosterol is utilized in the treatment of atherosclerosis in humans and possesses properties which render it useful as an emulsifying agent and stabilizer for water and oil emulsions. Derivatives of sitosterol have many potential uses as intermediates in the synthesis of steroids and generally in the field of pharmacology.

Sitosterol has the following formula:

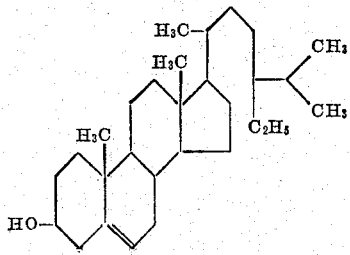

The above formula is that usually given for $\beta$-sitosterol, and the final purified product of one embodiment of the process of this invention is purified $\beta$-sitosterol. It will be understood, nevertheless, that the process of this invention is equally suitable for the purification of other sitosterols, such as $\gamma$-sitosterol and dihydro-$\beta$-sitosterol.

In its chemically pure state sitosterol is a pure white crystalline compound. High purity is of primary importance in such compounds when used as heretofore noted, particularly when used for pharmaceutical purposes. The purity reduces unpalatability, off-flavor and off-odor when used directly in pharmaceutical products and contributes materially to the whiteness of the compound. A convenient standard of acceptability of sitosterol or other sterols when used for pharmaceutical or other purposes is an absorbance of 0.10 or less on a Beckman DU Spectrophotometer at 400 m$\mu$ in five percent chloroform solution.

The products produced by the process of this invention are not only white in color, but are also of high chemical purity. For example, sitosterol products of the process as typified by the examples which follow possess optical rotation, $[\alpha]_D$, falling consistently within the range of minus 33 to minus 35 degrees, inclusive, and melt consistently within the range of 136 to 143 degrees centigrade. These values compare with $[\alpha]_D$ minus 36 degrees, and 140 degrees centigrade, respectively, as is reported in the literature for analytically pure $\beta$-sitosterol.

Prior methods for the purification of sterols such as sitosterol have entailed the use of tedious physical procedures or costly chemical conversion steps, or both. For example, one method is to prepare a bromide derivative of an acetylated sitosterol source which can also contain stigmasterol, followed by recrystallization procedures to separate sitosteryl acetate dibromide, which is then debrominated and hydrolyzed. Non-chemical procedures have involved the use of molecular distillation, decolorization with carbon, tedious repeated recrystallization steps, or a combination of these.

In our experience, up to now, the most satisfactory prior methods from a technical and economical standpoint have involved the use of decolorizing-carbon treatment of unwieldly volumes of crude sitosterol solutions, e.g., alcoholic solutions. This is, however, an inherently difficult and inconvenient procedure avoided by most engineers if at all possible. Furthermore, the quality of the sitosterol product is only moderately good.

As will be seen below, the process of this invention is simple and involves the use of solvents and equipment that are relatively easy to handle and operate.

According to the invention, the process involves two principal steps. The first step is a crystallization step which comprises providing a solution at fifty degrees centigrade, or more, advantageously within the range of fifty to 75 degrees centigrade, of the sterol material to be purified in a solvent mixture which comprises a halogenated aliphatic hydrocarbon of one to four carbon atoms, inclusive, and an aliphatic hydrocarbon of from five to eight carbon atoms, inclusive. The halogenated hydrocarbon solvent can be ethylene dichloride, methylene chloride, propylene dichloride, chloroform, ethylene dibromide, tetrachloroethylene, carbon tetrachloride, 2-chloropropane, dichloroisobutane, and the like. The aliphatic hydrocarbon solvent can be any of the light hydrocarbons used as solvents in industry, containing from five to eight carbon atoms, inclusive, such as normal pentane, normal hexane, isohexane, normal heptane, isoheptane, normal octane, isooctane, and the like. The concentration range of the sterol material in this solution can be from, say, about thirty up to about sixty percent by weight.

The relative proportion of halogenated hydrocarbon to aliphatic hydrocarbon should be within the range of forty to 75 percent by volume of the former to sixty to 25 percent by volume of the latter, a preferred mixture being the binary azeotrope of ethylene dichloride and normal heptane, i.e., 63 percent and 37 percent, respectively.

A convenient method for preparing the solution is first to dissolve or suspend the crude sterol in about four or five times its weight of solvent and then heat the mixture near its boiling point, concentrating the solution to the desired strength while effecting solution of the sterol. A convenient material is the sitosterol residual fractionation filtrate of a stigmasterol fractionation separation process which employs as fractionation solvent a mixture of a halogenated aliphatic hydrocarbon and an aliphatic hydrocarbon.

The solution temperature is adjusted to fifty degrees centigrade, or more. The concentration of sterol material in the solution is adjusted to between thirty and sixty percent by weight, as previously stated. At this point water is added to the solution in the range of 0.9 to 2.0 or more percent by weight of dissolved solids, preferably 1.0 to 1.5 percent. The temperature of the mixture when the water is added and thereafter should be adjusted so as to retain the water in the liquid state, e.g., below the boiling point of the azeotropic mixtures that would be involved. An effect of the water is to modify crystal structure and size, producing fine grained crystals and favorably affecting the yield. Another effect is to force out the sterol from solution, probably by partial hydration, the addition of the water being an essential feature of the crystallization step.

Upon cooling to below fifty degrees centigrade, preferably in the range of 35 to minus ten degrees centigrade, the mixture rapidly becomes a slurry of sterol crystals, whereupon the crystals are separated as by filtration, decantation or centrifugation. The separated crystals can be washed with a hydrocarbon solvent of the kind mentioned above to remove residual coloring matter. The crystalline sterol product usually has an absorbance of around 0.16 to 0.18 at this stage of the process.

The second step of the present invention is a contacting step, which if desired can be carried out in practice as a partial or complete recrystallization of the product of the crystallization step. The initial stage of this step is the preparation of a contacting mixture, e.g., a slurry of the crystallized sterol from the first principal step and a light aliphatic hydrocarbon solvent containing from five to eight carbon atoms, inclusive, such as normal pentane, normal hexane, isohexane, normal heptane, isoheptane, normal octane, isooctane, and the like. Of these, for the sake of economy and convenience, we prefer normal heptane. The contacting is carried out by maintaining the crystalline product as a slurry, preferably with agitation, for a period of at least twenty minutes, using 25 to 45 percent by weight of crystals, at a temperature within the range of about zero and thirty degrees centigrade. The upper time limit is not critical, inasmuch as the material can be maintained for one month or longer with good final results.

The recrystallization can be regarded as a variation of the contacting step wherein the conditions are adjusted to achieve partial or complete solution of the crystalline sterol in the aliphatic hydrocarbon solvent. This can be done by using temperatures sufficiently high and/or sufficient quantities of solvent to effect the dissolving of the sterol, followed by concentration of the solution and/or cooling sufficiently to bring the purified sterol product out of solution.

The process can be varied optionally by applying a stage of clarification filtration, carried out in conventional manner, to the solutions just prior to either or both of the principal steps, either in the crystallization (first) step, or the recrystallization stage of the second step. One advantage of varying the second step of the process so as to dissolve completely the sterol crystals is that this facilitates the insertion of a clarification filtration stage prior to recrystallization.

The following examples are illustrative of the process and products of the present invention, but are not to be construed as limiting.

EXAMPLE 1

The filtrate, obtained from the fractionation separation of stigmasterol from soybean sterols, was a solution of approximately twenty percent by weight of crude sterols, principally sitosterol, in a solvent consisting of approximately 37 percent normal heptane and 63 percent ethylene dichloride, by volume. A sample of the dissolved solids, obtained by evaporation of the solvent, had an absorbance of 2 to 2.5 and a melting point between the range of 100 to 140 degrees centigrade. The dissolved solids included approximately 2.6 percent stigmasterol and were dark brown in color while in the filtrate solution, and dark brown and gummy when isolated from the solution. A portion of this filtrate containing 302 pounds of dissolved solids was placed in a vessel and concentrated to ninety gallons (forty percent concentration) by distillation. The solution was cooled slowly to sixty degrees centigrade with stirring, whereupon 1475 milliliters of water was added, and the mixture allowed to cool to twenty degrees centigrade overnight with stirring. Crystals of sitosterol separated, making a fine grained crystalline precipitate. The mixture was filtered, 145 pounds of crystals having an absorbance of 0.172 being recovered as the filter cake. The solvent contained dissolved solids which, upon separation of the solvent by evaporation, had an absorbance of 2.53. The filtered crystals were washed with normal heptane and slurried in 63 gallons of normal heptane. The temperature of the slurry was adjusted to 16 to twenty degrees centigrade, and the slurry was stirred for a period of two hours. The slurry was filtered, whereupon 134 pounds of β-sitosterol crystals having an absorbance of 0.036, melting at 141 to 143 degrees centigrade, and having $[\alpha]_D$ minus 34 degrees, were recovered. The filtrate contained nine pounds of dissolved solids having an absorbance of 2.06. This was set aside for recycle to the first (crystallization) step of a succeeding run.

EXAMPLE 2

6.2 pounds of recycled sitosterol from the slurry stage of a preceding run, having an absorbance of about 2.0, was mixed with filtrate (containing 30.1 pounds of dissolved solids) from a stigmasterol fractionation separation to make up a solution in which the principal sterol constituent was β-sitosterol. The concentration of the solution was adjusted to approximately forty percent by weight by evaporation of the solvent (comprising 37 percent normal heptane and 63 percent ethylene dichloride); 0.4 pound of water was added after cooling to sixty degrees centigrade, and the solution was cooled slowly to twenty degrees centigrade and stirred overnight. The resulting slurry of crystals was filtered, yielding a filtrate containing 12.5 pounds of dissolved solids, and a crystalline product weighing 22.4 pounds. The crystals were admixed with 7.5 gallons of normal heptane and held at about 18 degrees centigrade for four hours. The β-sitosterol product, after filtration on a rotary disk filter, had an average absorbance of 0.03, $[\alpha]_D$ 35 degrees, and melted at 139 to 141 degrees centigrade. This product weighed approximately 15.5 pounds, and the filtrate (containing 6.9 pounds of dissolved solids) was recycled to the next succeeding (crystallization) step.

In place of the above, crude sitosterol cake, obtained by evaporating the solvent from the filtrate of the fractionation separation production of stigmasterol from soybean sterols can be employed by putting it in solution in a 50:50 mixture, by volume, of ethylene dichloride and normal heptane. Subsequent crystallization, filtration, slurrying, and final filtration as described above is productive of sitosterol possessing an absorbance of from 0.03 to 0.07. The use of slightly higher holding temperatures in the second principal step, i.e., the contacting step to effect complete solution, is preferred, followed by a clarification filtration stage, in instances where the final absorbance value of the sterol product is improved thereby.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for producing purified sterol which comprises providing a solution of a crude sterol mixture containing not more than 20 percent by weight of impurities, said impurities comprising non-sterol matter, in a solvent comprising a mixture of a halogenated aliphatic hydrocarbon containing from one to four carbon atoms, inclusive, and an aliphatic hydrocarbon containing from five to eight carbon atoms, inclusive, in the proportion of thirty to sixty percent by weight of said sterol mixture, adjusting the temperature of said solution to at least fifty degrees centigrade, adding water thereto in a range of 0.9 to 2.0 percent, based on the weight of dissolved solids, cooling the resulting mixture to a temperature within the range of 35 degrees centigrade to minus ten degrees centigrade, thus to form relatively fine crystals of said sterol, separating said crystals from the solvent mixture, and separating further impurities from said crystals by contacting them with an aliphatic hydrocarbon, as defined above.

2. A process for producing purified sterol which comprises providing a solution of a crude sterol mixture containing not more than 20 percent by weight of impurities, said impurities comprising non-sterol matter, in a solvent comprising a mixture of a halogenated aliphatic hydrocarbon containing from one to four carbon atoms, inclusive, and an aliphatic hydrocarbon containing from five to eight carbon atoms, inclusive, in the proportion of thirty to sixty percent by weight of said sterol mixture, adjusting the temperature of said solution to at least fifty degrees centigrade, adding water thereto in the range of 0.9 to 2.0 percent based on the weight of dissolved solids, cooling the resulting mixture to a temperature within the range of 35 degrees centigrade to minus ten degrees centigrade, thus to form relatively fine crystals of said sterol, separating said crystals from the solvent mixture, and slurrying said crystals in a slurry medium of an aliphatic hydrocarbon of from five to eight carbon atoms, inclusive, and separating sterol crystals from said slurry.

3. A process for purifying sitosterol material containing non-sterol impurities which comprises crystallizing sitosterol from a crystallizing solution comprising a mixture of a halogenated aliphatic hydrocarbon containing from one to four carbon atoms, inclusive, an aliphatic hydrocarbon containing from five to eight carbon atoms, inclusive, and 0.9 to 2.0 percent of water based on the weight of dissolved solids, separating said crystallized sitosterol and contacting the separated sitosterol crystals with an aliphatic hydrocarbon as defined above to form a contacting mixture to remove further impurities therefrom, and separating crystals of purified sitosterol from said hydrocarbon.

4. The process of claim 3 wherein the crystallizing solution comprises as solvent a mixture of ethylene dichloride and normal heptane, and normal heptane is the aliphatic hydrocarbon component of the contacting mixture.

5. The process of claim 4 wherein the crystallizing solution comprises as solvent a mixture of about 63 percent by volume of ethylene dichloride and about 37 percent by volume of normal heptane.

6. The process of claim 5 wherein the temperature of the contacting mixture of sitosterol crystals is adjusted with respect to the quantity of solvent to effect solution of the sitosterol, and purified sitosterol is subsequently crystallized therefrom.

7. A process for producing purified β-sitosterol which comprises providing a solution comprising a major proportion of β-sitosterol and a minor proportion of impurities, said impurities comprising non-sterol matter, in a solvent comprising a mixture of about 63 percent by volume of ethylene dichloride and about 37 percent by volume of normal heptane, the proportion by weight of β-sitosterol in the solution being in the range of thirty to sixty percent, adjusting the temperature of said solution to at least fifty degrees centigrade, adding water thereto in the range of 1.0 to 1.5 percent, based on the weight of dissolved solids, cooling the resulting mixture to a temperature within the range of 35 degrees centigrade to minus ten degrees centigrade, thus to form relatively fine crystals of β-sitosterol, separating said crystals from the solvent mixture, slurrying said crystals in normal heptane, adjusting the temperature and quantity of solvent of said slurry to effect solution of β-sitosterol and subsequently crystallizing purified β-sitosterol therefrom.

References Cited in the file of this patent

UNITED STATES PATENTS

| | | |
|---|---|---|
| 2,494,726 | Sifferd et al. | Jan. 17, 1950 |
| 2,499,430 | Vogel | Mar. 7, 1950 |
| 2,772,297 | Laquer | Nov. 27, 1956 |
| 2,839,544 | Greiner et al. | June 17, 1958 |
| 2,866,797 | Berry et al. | Dec. 30, 1958 |